Sept. 10, 1968  A. L. LAICH  3,400,596
ADJUSTABLE OPTICAL ELEMENT SUPPORTING APPARATUS
Filed April 15, 1966  3 Sheets-Sheet 1
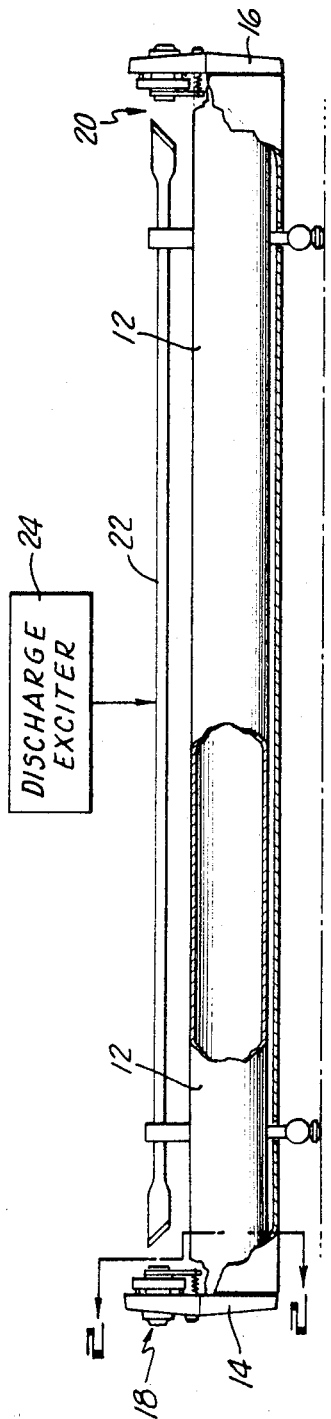
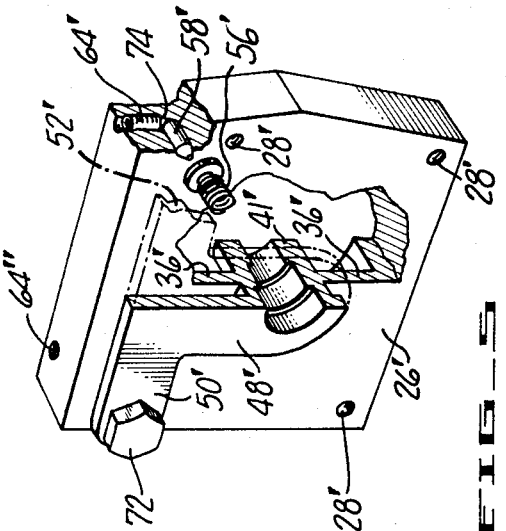
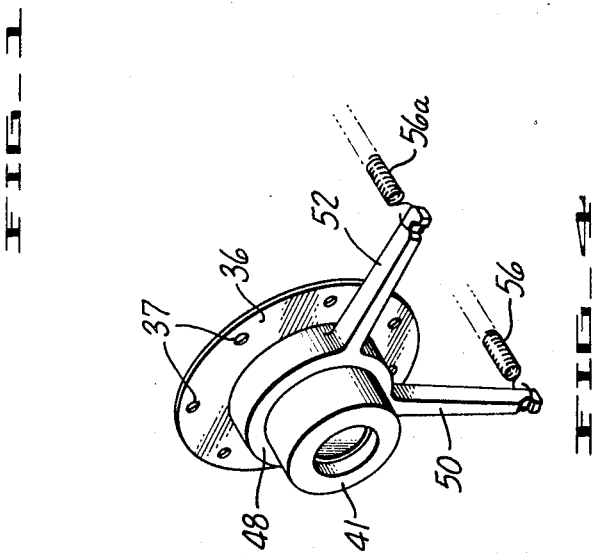
ALBERTO L. LAICH
INVENTOR.
BY *J. Rosenblum*
ATTORNEY

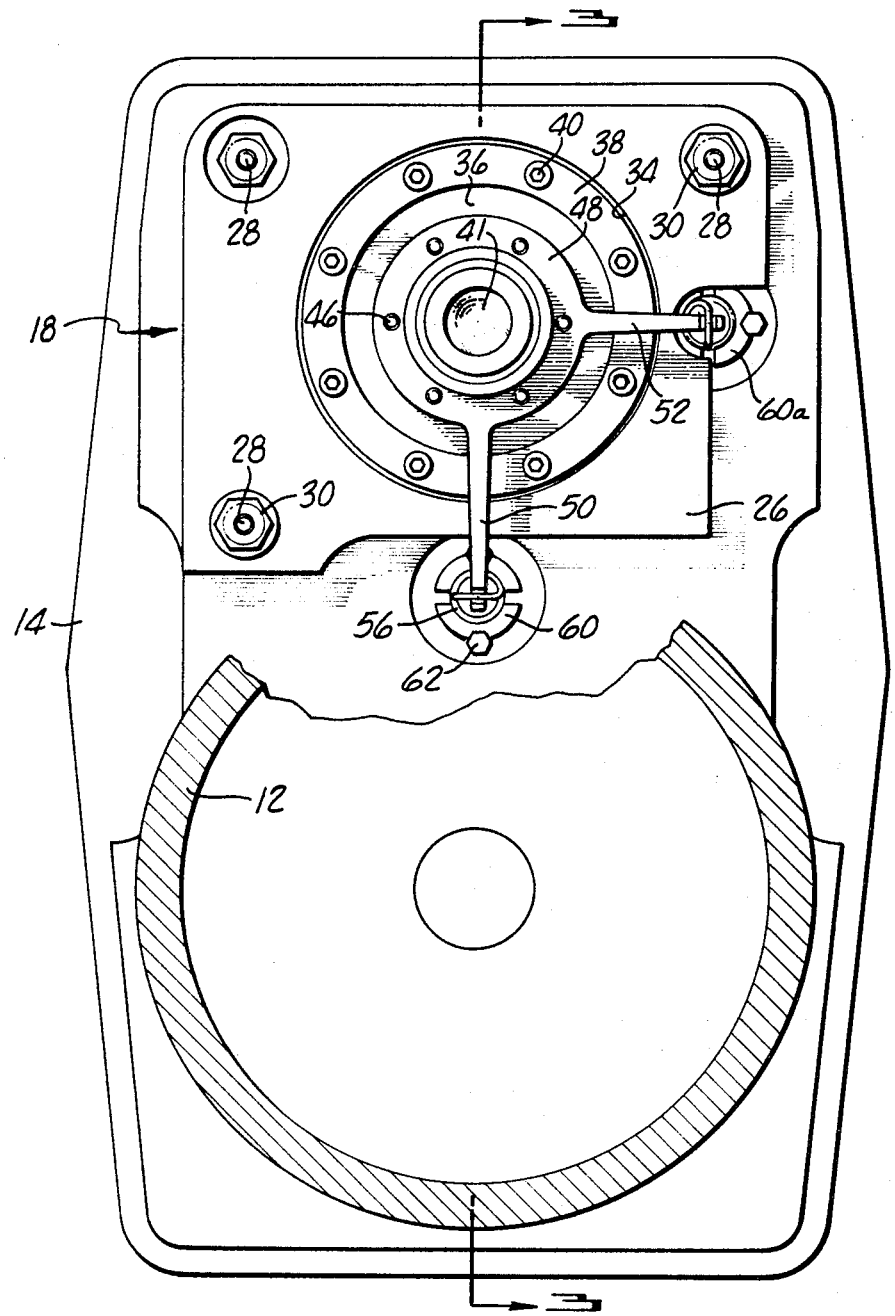
FIG_2

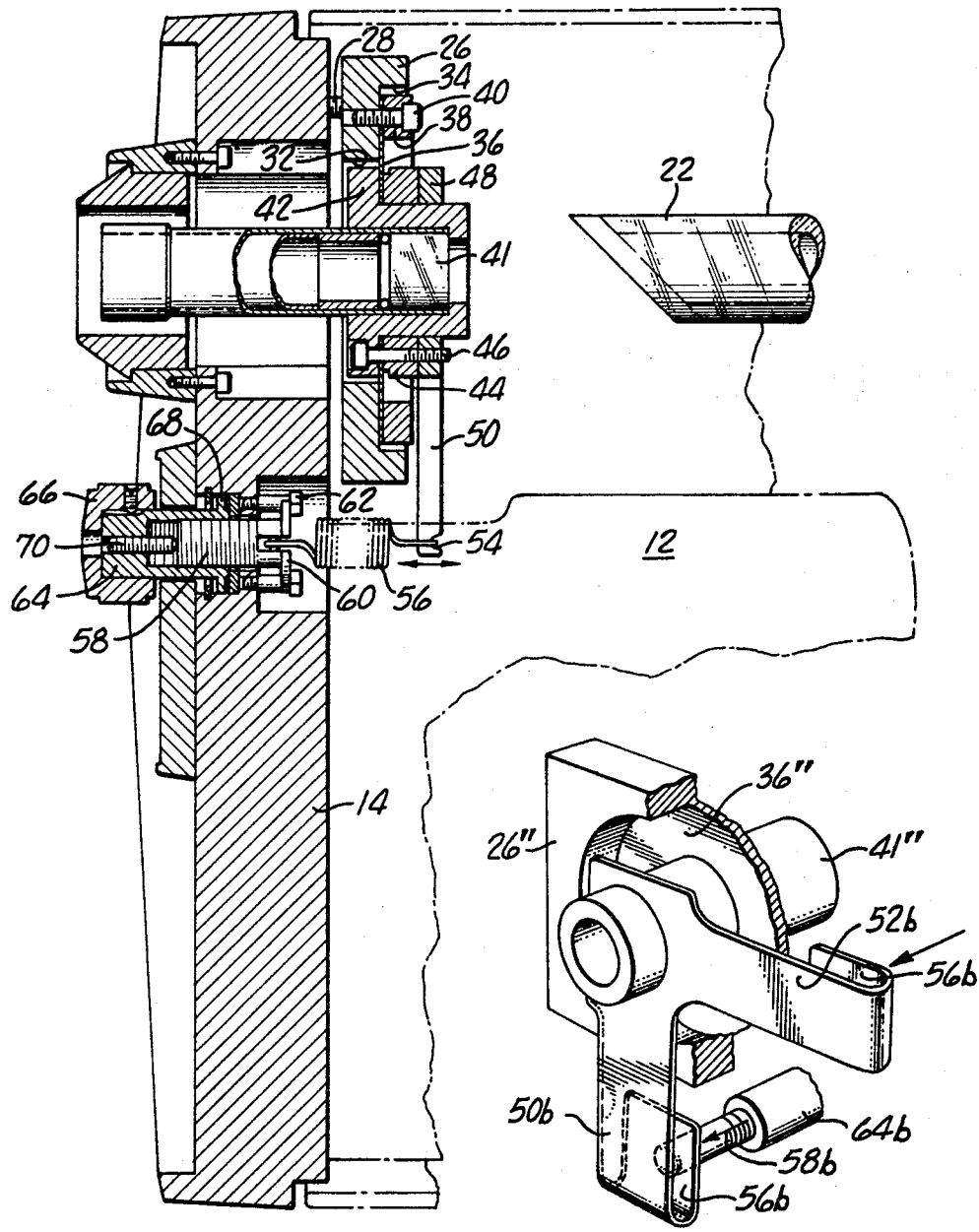

United States Patent Office 3,400,596
Patented Sept. 10, 1968

3,400,596
ADJUSTABLE OPTICAL ELEMENT SUPPORTING APPARATUS
Alberto L. Laich, Rockville, Md., assignor to Spectra-Physics, Inc., Mountain View, Calif., a corporation of California
Filed Apr. 15, 1966, Ser. No. 542,842
13 Claims. (Cl. 74—89.15)

ABSTRACT OF THE DISCLOSURE

Apparatus for adjustably supporting an optical element in precise spacial relationship relative to the optical axis of a laser or other optical system. The optical element is mounted in the central portion of a resilient diaphragm, with the peripheral margin of the diaphragm being mounted in fixed relation to the optical avis. A pair of elongated arms extend radially from the optical element mounting for applying a bending moment about each of two perpendicular axes transverse to the optical axis. The resulting elastic deformation of the resilient diaphragm permits independent adjustment of angular rotation of the optical element about each of these perpendicular axes. To controllably and precisely position the optical element, a motion transmitting mechanism is provided for independently actuating each moment arm, which mechanism includes a resilient portion for reducing the amount of actuating motion transmitted to the respective moment arms.

---

This invention relates to apparatus for adjustably supporting an optical element in precise spacial relationship relative to an optical axis. Although the apparatus is described herein in connection with a laser, uses of the apparatus in other optical systems will occur in those versed in the art.

Laser oscillation is initiated and sustained by reflections of selected light frequencies from an optical element back into a tube or rod in which the frequencies are generated in the first instance. In order to maximize the amplitude of the signal generated and to eliminate generation of spurious signals, the angular relationship between the optical element and the tube is of crucial importance. The present invention provides apparatus for adjustably establishing the angular relationship of the optical element to afford optimum operation of the laser or like equipment with which the optical element is employed.

The principal object of the invention is to provide optical element aligning apparatus that is extremely rugged and uncomplex as compared with known structures for the same purpose. This object is achieved in the present invention by mounting the optical element on the central portion of a resilient diaphragm, the periphery of which diaphragm is rigidly mounted relative an optical axis through a laser plasma tube. The optical element is angularly displaced about two axes transverse of the optical axis to appropriately position the optical element and such position is maintained by the stresses set up in the diaphragm as a result of such displacement. The resilient diaphragm of the present invention performs the dual function of movably supporting the optical element and establishing a resilient force that counters force applied by adjusting mechanisms, thereby retaining the optical element at the position to which it is moved during adjustment. Thus the present structure constitutes a marked improvement over various prior art devices designed for the same purpose, which devices include gimbal-like structures for affording the necessary adjustment.

An advantageous feature of the present invention is that the size and resilience of the diaphragm can readily be chosen so that the resonant frequency of mechanical vibration of the optical element is widely separated from any spurious mechanical or electrical frequencies generated by the apparatus. Thus, should equipment employing the present apparatus be subject to inadvertent mechanical impact, the optical elements, if they are displaced at all, will not tend to oscillate, but will quickly return to their pre-set position.

Another advantageous feature of the present invention is that the diaphragm mounting of the optical element affords a high degree of linearity between the angular position of the optical element and the rotative position of control knobs provided for establishing the angular position. Consequently, adjustment of the optical element is quickly and efficiently accomplished.

Yet another advantageous feature of the present invention is that the diaphragm mounting of the optical element affords substantially independent adjustment of the optical element about separate mutually perpendicular axes. Thus, the element can be adjustably positioned relative a vertical axis without affecting the position of the element relative a horizontal axis, and vice versa.

A further object of this invention is to provide in combination with the diaphragm mounted optical element an adjustment linkage that effects a minute angular movement for a relatively large manual adjustment, for example, by rotation of a control knob. This object is attained by providing in the adjustment linkage between the control knob and optical element a resilient member having a spring constant less than that of the diaphragm. Also provided is mechanism for tensioning such spring element, which mechanism includes a threaded member associated with a finger knob. Thus only a portion of the force and motion applied at one end of the resilient element in response to rotation of the knob is transmitted to the other end of the resilient member, which is attached to the diaphragm mounted optical element. Such improved linkage is analogous in operation to a gear train employing a small driving gear and a large driven gear wherein large movement of the driving gear effect small movements in the driven gear.

Yet another object is to provide a rigid frame for supporting the diaphragm and means for supporting the frame for coarse angular adjustment relative to the optical axis. Such coarse adjustment permits the rigid frame to be initially positioned so as to place the diaphragm in a stressed condition throughout the entire range of fine angular adjustment. Accordingly, the mounting device can be adjusted to assure that the resilient diaphragm is within the elastic limit of the material of which it is made.

Other objections, features and advantages will be more apparent after referring to the following specification and accompanying drawings in which:

FIG. 1 is a side elevation view partially broken away of a gas laser employing the present invention;
FIG. 2 is a cross-sectional view at enlarged scale taken along line 2—2 of FIG. 1 with the outer cover removed;
FIG. 3 is a cross-sectional view taken along line 3—3 of FIG. 2;
FIG. 4 is a fragmentary perspective view of a portion of the apparatus of FIG. 2;
FIG. 5 is a perspective view of another embodiment of the invention; and
FIG. 6 is a perspective view of still another embodiment of the invention.

Referring more particularly to the drawing, reference numeral 12 indicates an elongate tubular optical resonator support structure on opposite longitudinal ends of which are mounted structural end plates 14 and 16 that support optical reflector assemblies 18 and 20 respectively. Also supported on structure 12 intermediate optical reflector assemblies 18 and 20 is a plasma tube 22 which when excited by a suitable discharge exciter 24 generates optical frequencies that are emitted from the longitudinal ends of the plasma tube to reflector assemblies 18 and 20. Such optical frequencies are reflected by mirror surfaces carried in the assemblies back into the plasma tube. At least one of the reflector assemblies may, by a known technique involving the interposition of a prism, be so angularly oriented relative the optical axis of plasma tube 22 that only selected frequencies are reflected back into the plasma tube, the effect of which is that oscillation at preselected optical frequencies will take place in the plasma tube, which frequencies will reach an amplitude sufficient to pass through one or both of the reflector assemblies for use in forming a useful laser beam.

Precise angular orientation of the reflector assemblies is essential for optimum operation of the laser; the present invention provides apparatus for precisely adjusting the optical reflector elements, a satisfactory form of which is shown in enlarged detail in FIGS. 2, 3 and 4. Referring to FIG. 2, a frame plate 26 is mounted on structural end plate 14 for coarse adjustment relative thereto by three screws 28, each of which is provided with an inner nut 30 for contacting the inner surface of frame plate 26 and an outer nut, not shown, for contacting the other surface of the frame plate. Coarse adjustment of plate 26 relative plate 14 can be had by appropriate positioning of nuts 28 and their outer counterparts.

Frame plate 26 is formed with a central opening 32, which opening is in approximate alignment with plasma tube 22. On the inner surface of frame plate 26 an enlarged counterbore 34 is formed coaxially with opening 32. A resilient diaphragm 36 is disposed in the counterbore. The diaphragm has mounting holes 37 therein whereby it is clamped rigidly onto frame plate 26 at the outer peripheral margin of the diaphragm by a rigid outer ring 38 affixed to frame plate 26 by screws 40. The diaphragm in one structure designed according to the present invention was formed of an annulus of stainless spring steel.

Diaphragm 36 is centrally apertured to received an optical element assembly 41 which assembly includes a radially extending flange 42 that bears against the outer surface of the diaphragm. An inner rigid ring 44 is provided for clamping flange 42 onto the central portion of diaphragm 36, screws 46 being provided for drawing the inner ring toward the flange. Thus it will be seen that optical element assembly 41 is supported in approximate alignment with plasma tube 22 and is capable of at least a limited degree of movement because of the resilience of diaphragm 36.

For accomplishing precise adjustment of optical element 41 a yoke 48 is rigidly secured to the optical element by engagement with screws 46. Rigid with yoke 48 and radially extending therefrom along mutually perpendicular lines are a vertical adjusting arm 50 and a horizontal adjusting arm 52. Force applied to the ends of the arms will distort diaphragm 36 so as to adjustably position optical element 41.

Since the mechanism for applying force to the outer end of arm 50 is substantially identical to the mechanism for supplying force to the outer end of arm 52, a detailed explanation of only the former mechanism will be given. Referring to FIG. 3 the outer end of arm 50 is notched at 54 to engage one end of a tension coil spring 56, the other end of which is engaged on a sleeve 58 slidably carried in a suitable bore in structural plate 14. Sleeve 58 is provided with an end flange 60 that has peripheral notches slidably engaged on studs 62 so as to prevent rotation of the sleeve. An exteriorly threaded portion of sleeve 58 on the end thereof remote from flange 60 is engaged by an interiorly threaded control shaft 64 to the outer end of which is secured an adjusting knob 66. Control shaft 64 has a radial flange 68 for preventing axial movement thereof so that rotation of the control member will effect axial movement of sleeve 58 and a consequent increase or decrease of tension on spring 56. A locking screw 70 is provided for locking the relative position of sleeve 58 and control shaft 64.

If it is assumed that control shaft 64 is rotated through knob 66 in such direction to move sleeve 58 leftwardly, as viewed in FIG. 3, the tension in spring 56 will increase and the force applied to the outer end of arm 50 will correspondingly increase to rotate optical element 41 about a horizontal axis and against the force of diaphragm 36. The amount of angular movement of optical element 41 is very small compared to the amount of rotative movement for the following reasons: (a) the threads forming the threaded connection between adjustable member 64 and sleeve 58 are extremely fine as a consequence of which a full revolution of control shaft 64 effects but slight longitudinal movement of sleeve 58; (b) notch 54 is at a greater distance from the optical axis than is the resilient portion of diaphragm 36 that flexes on movement of arm 50; and (c) the spring constant of spring 56 is less than the spring constant of diaphragm, as a consequence of which only a portion of the movement effected at the end of the spring attached to sleeve 58 is transmitted to the opposite end of the spring, a substantial proportion of the movement being taken up by expansion or contraction of the spring. As has been stated above the adjustable mechanism for horizontal arm 52 is substantially identical and includes, for example, a spring 56a, similar to spring 56 and a sleeve having flange 60a similar to flange 60 on sleeve 58.

The operation of the aforedescribed embodiment of the invention can now be more fully appreciated. Frame plate 26 is initially positioned by adjustment of nuts 30 on respective shafts 28 to bias optical element 41 in a horizontal and vertical direction opposite that provided by the tension force at the outer ends of arms 50 and 52. Such initial adjustment is preferably made with sleeve 58 at its extended or rightwardmost position, as viewed in FIG. 3. Knob 66 is then rotated to tension spring 56 so as to apply force on arm 50 and bring optical element 41 into the desired alignment. Because the angular movement of optical element 41 is slight as compared with the rotative movement of knob 66, such adjustment can be quickly and accurately made.

Another embodiment of the present invention is shown in FIG. 5 wherein resilient diaphragm 36' is formed integrally with a frame plate 26' by reducing the thickness of the central portion of the frame plate to define the resilient diaphragm. In one apparatus designed according to the embodiment of FIG. 5, frame plate 26' and diaphragm 36' are formed of aluminum. The frame plate is provided with three spaced apart holes 28' for affording coarse adjustment thereof in the manner outlined above with respect to screws 28 and nuts 30. Optical element supporting structure 41' is also formed integrally with diaphragm 36' and frame plate 26' and has extending radially therefrom and integral therewith a plate 48' having arms 50' and 52' at the outer end thereof. Arm 52' is shown fragmentarily to reveal internal details and is identical to arm 50'. The ends of the arms confront the surface of frame plate 26' in approximate parallel spaced apart relation radially outwardly of the optical axis through optical element 41'. At the outer extremity of each arm 50', 52', a cap screw 72, or the like, is provided for defining a socket to receive one end of a compression spring 56'. In alignment with the opposite end of compression spring 56', frame plate 26' is bored to slidably support a pin 58'. Transversely of the bore supporting pin 58' is a threaded hole in which is threadedly engaged a screw 64'; the contacting ends of pin 58' and screw 64' are tapered as at 74 so that on rotation of the screw inwardly of the hole in frame plate 26' the pin will be urged outwardly of its bore so as to compress spring 56'. It will thus be seen that rotation of screw 64' will effect movement of optical element 41 about an axis normal to a line passing through the optical axis of the optical element and compression spring 56'. A screw 64" is provided for effecting movement of the optical element about a perpendicular axis. As in the case of the embodiment described hereinabove in connection with FIGS. 1–4, the spring constant of compression spring 56' is less than the spring constant of diaphragm 36', and the length of arms 50' and 52' is large with respect to the distance from the optical axis to the area of joinder of optical element 41' with the diaphragm. Accordingly, a relatively large rotative adjustment of screws 64' and 64" will effect a very small angular adjustment of the optical element, thereby expediting angular alignment of the optical element.

Still another modification of the present invention is shown in FIG. 6 in which a frame plate 26" is provided for attachment to structural end plate 18 by a suitable coarse angle adjusting mechanism not shown.

Frame plate 26" has in the center portion thereof an integral diaphragm 36" centrally of which is mounted an optical element supporting structure 41". Secured to the optical support element is a resilient plate having mutually perpendicularly oriented leaf spring arms 50b and 52b. Each of the arms at its outer extremity has a reversely bent portion 56b against which is contacted a micrometer shaft 58b that moves axially thereof in response to rotation of a control element 64b which is threadedly engaged to the shaft 58b. Arms 50b and 52b are constructed from a material having a smaller spring constant than the material of which diaphragm 36" is formed so that on adjustment of knob 64b and a similar knob, not shown, corresponding to arm 52b, the optical element can be angularly oriented as described hereinabove in respect to the other embodiments of the invention. Because the spring constant of the arms is less than that of the diaphragm, relatively large rotative adjustments of knobs 64b will effect relatively small angular movements of the optical element so as to promote efficient and rapid adjustment of optical element orientation.

In practicing the present invention, it has been found that the resonant mechanical frequency of the diaphragm mount can be made sufficiently high to avoid spurious vibrations by properly proportioning the ratio of the diameter of the diaphragm to the thickness thereof. Specifically, the difference in diameter of the point where the diaphragm is joined to frame plate 26 and where it is joined to the optical element should be less than about ten times the thickness of the diaphragm to secure the desired resonant mechanical frequency. Also, such relationship generally assures that the diaphragm will be within the elastic limit of the material of which it is made throughout all angular positions of adjustment of optical element 41. It has been found that the vertical and horizontal adjustments are at least 95% orthogonally independent of one another. Moreover lateral, as opposed to rotative, movement applied to the diaphragm mounted optical element is insignificant. Thus, the invention provides a sturdy and simple optical element mounting structure that is capable of rapid and precise angular adjustments.

While for purposes of illustration the axes of the plasma tube 22 and the optical element 41 have been shown as coaxial, practically, these axes are parallel and spaced apart by the small amount of deflection of the laser beam due to refraction as it passes through the Brewster angle window at the end of the tube. Additionally, while generally a separation of these axes implies location of the diaphragm coaxial with the optical element in order to place the optical element in the exact center of the diaphragm, the amount of deflection of the laser beam is small enough to permit proper adjustment of the reflector assemblies when the plasma tube and the diaphragm are coaxially located for ease of construction and assembly with the axes of the diaphragm and the optical element spaced apart by an amount equal to the beam displacement. Therefore, the terms "centrally" and "central portion" when referring to the diaphragm are used herein and in the appended claims to include the latter construction.

While several embodiments of the present invention have been shown and described, it will be obvious that other adaptations and modifications can be made without departing from the true spirit and scope of the invention.

What is claimed is:

1. Aparatus for adjustably positioning an optical element with respect to an optical axis comprising a resilient diaphragm having a central portion bounded by a peripheral margin, means for mounting said peripheral margin in fixed relation to said axis, means for mounting said optical element to the central portion of said diaphragm and on said optical axis, means for controllably applying a moment to said optical element mounting means about a first axis transversely intersecting said optical axis, and means for controllably applying a moment to said optical element mounting means about a second axis transversely intersecting said optical axis and said first axis, said second axis being substantially perpendicular to said first axis.

2. Apparatus according to claim 1 wherein said peripheral margin mounting means includes a rigid base extending generally transversely of said optical axis, and wherein said moment applying means comprise first and second elongate members mounted in said base for slidable movement on axes parallel and spaced from said optical axis, means for adjustably positioning said elongate member along respective said axis, and means for transmitting the motion of respective said elongate members to said optical element mounting means, said motion transmitting means including a resilient portion to reduce the amount of motion of said elongate members that is transmitted to said optical element mounting means.

3. Apparatus according to claim 1 wherein said resilient diaphragm defines an opening centrally thereof and wherein said optical element mounting means supports said optical element in alignment with said opening.

4. Apparatus according to claim 2 wherein said rigid base defines first and second bores extending therethrough for slidably supporting respective said elongate members, wherein said elongate members include an exteriorly threaded sleeve disposed in said bore and means for preventing rotation of said sleeve in said bore, and wherein said positioning means includes an interiorly threaded body in threaded engagement with respective said elongate members so that rotation of said body effects movement of said sleeve axially of said bore.

5. Apparatus according to claim 2 wherein said motion transmitting means comprises first and second arms rigid with said optical element mounting means and extending radially therefrom and a pair of tension springs having first ends joined with respective ends of said arms and second ends joined to respective said elongate members.

6. Apparatus according to claim 2 wherein said motion transmitting means comprises first and second resilient arms extending radially from said optical element mounting means, said resilient arms having outer portions contacting respective said elongate members.

7. Apparatus according to claim 2 wherein said motion transmitting means comprises a plate rigid with said optical element mounting means and having two openings therein aligned with the elongate members, a compression spring carried in respective said openings for contacting said elongate members and defining said resilient portion, said elongate members having a tapered portion at the end remote from said rigid spring, said rigid base defining a threaded hole transverse to the bore in which said elongate members are mounted and a screw in each said hole having a tapered end portion engageable with the end portion of said elongate member so that rotation of said screw moves said elongate member along said axis.

8. The invention of claim 1 wherein said diaphragm and said peripheral margin mounting means are formed integrally with one another.

9. The invention of claim 8 wherein said diaphragm and said peripheral margin mounting means are formed of aluminum.

10. The invention of claim 1 wherein the diametral extent of said diaphragm intermediate said peripheral margin mounting means and optical element mounting means is less than about ten times the thickness of said diaphragm.

11. Apparatus for adjustably positioning an optical element with respect to an optical axis comprising a resilient diaphragm having a central portion bounded by a peripheral margin, means for mounting said peripheral margin in fixed relation to said optical axis including a rigid base extending generally transversely of said optical axis, means for mounting said optical element to the central portion of said diaphragm and on said optical axis, means for controllably applying a moment to said optical element mounting means about a first axis transversely intersecting said optical axis, and means for controllably applying a moment to said optical element mounting means about a second axis transversely intersecting said optical axis and said first axis, said second axis being angularly spaced from said first axis, and wherein said moment applying means comprise first and second elongate members mounted in said base for slideable movement on axes parallel and spaced from said optical axis, means for adjustably positioning said elongate member along respective said axes, and means for transmitting the motion of respective said elongate member to said optical element mounting means, said motion transmitting means including a resilient portion to reduce the amount of motion of said elongate members that is transmitted to said optical element mounting means, and wherein said motion transmitting means comprises first and second resilient arms extending radially from said optical element mounting means, said resilient arms having outer portions contacting respective said elongate members.

12. Apparatus for adjustably positioning an optical element with respect to an optical axis comprising a resilient diaphragm having a central portion bounded by a peripheral margin, means for mounting said peripheral margin in fixed relation to said optical axis including a rigid base extending generally transversely of said optical axis, means for mounting said optical element to the central portion of said diaphragm and on said optical axis, means for controllably applying a moment to said optical element mounting means about a first axis transversely intersecting said optical axis, and means for controllably applying a moment to said optical element mounting means about a second axis transversely intersecting said optical axis and said first axis, said second axis being angularly spaced from said first axis, and wherein said moment applying means comprise first and second elongate members mounted in said base for slideable movement on axes parallel and spaced from said optical axis, means for adjustably positioning said elongate member along respective said axes, and means for transmitting the motion of respective said elongate members to said optical element mounting means, said motion transmitting means including a resilient portion to reduce the amount of motion of said elongate members that is transmitted to said optical element mounting means, and wherein said motion transmitting means comprises a plate rigid with said optical element mounting means and having two openings therein aligned with the elongate members, a compression spring carried in respective said openings for contacting said elongate members and defining said resilient portion, said elongate members having a tapered portion at the end remote from said spring, said rigid base defining a threaded hole transverse to the bore in which said elongate members are mounted and a screw in each said hole having a tapered end portion engageable with the end portion of said elongate member so that rotation of said screw moves said elongate member along said axis.

13. Apparatus for adjustably positioning an optical element with respect to an optical axis comprising a resilient diaphragm having a central portion bounded by a peripheral margin, means for mounting said peripheral margin in fixed relation to said optical axis, means for mounting said optical element to the central portion of said diaphragm and on said optical axis, the diametral extent of said diaphragm intermediate said peripheral margin mounting means and optical element mounting means being less than about ten times the thickness of said diaphragm, means for controllably applying a moment to said optical element mounting means about a first axis transversely intersecting said optical axis, and means for controllably applying a moment to said optical mounting means about a second axis transversely intersecting said optical axis and said first axis, said second axis being angularly spaced from said first axis.

References Cited

UNITED STATES PATENTS

| | | | |
|---|---|---|---|
| 3,359,812 | 12/1967 | Everitt | 74—89.15 |
| 3,045,535 | 7/1962 | Jacquinot et al. | |
| 3,204,471 | 9/1965 | Rempel | 74—89.15 |

FRED C. MATTERN, Jr., Primary Examiner.

F. D. SHOEMAKER, Assistant Examiner.